United States Patent
Hlatky et al.

(10) Patent No.: US 6,294,625 B1
(45) Date of Patent: *Sep. 25, 2001

(54) CATALYST SYSTEM OF ENHANCED PRODUCTIVITY AND ITS USE IN POLYMERIZATION PROCESS

(75) Inventors: George G. Hlatky; Howard William Turner, both of Houston; Jo Ann Marie Canich, Webster, all of TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 08/450,289

(22) Filed: May 25, 1995

Related U.S. Application Data

(60) Division of application No. 07/957,305, filed on Oct. 5, 1992, now abandoned, which is a continuation-in-part of application No. 07/542,236, filed on Jun. 22, 1990, and a continuation-in-part of application No. 07/496,378, filed on Mar. 20, 1990, now Pat. No. 5,153,157.

(51) Int. Cl.$^7$ ........................................................ C08F 4/44
(52) U.S. Cl. .......................... 526/160; 526/161; 526/943
(58) Field of Search ............................. 526/160, 96, 352, 526/161, 943; 502/103, 104, 117, 132, 118

(56) References Cited

U.S. PATENT DOCUMENTS

| | | | |
|---|---|---|---|
| 4,752,597 | 6/1988 | Turner | 502/104 |
| 4,791,180 | 12/1988 | Turner | 526/160 |
| 4,808,561 | 2/1989 | Welborn, Jr. | 502/104 |
| 4,871,705 * | 10/1989 | Hoel | 502/117 |
| 4,897,455 | 1/1990 | Welborn, Jr. | 526/129 |
| 5,017,714 | 5/1991 | Welborn, Jr. | 556/12 |
| 5,036,034 * | 7/1991 | Ewen | 502/117 |
| 5,049,535 * | 9/1991 | Resconi et al. | 502/132 |
| 5,055,438 | 10/1991 | Canich | 502/117 |
| 5,057,475 | 10/1991 | Canich et al. | 502/104 |
| 5,064,802 | 11/1991 | Stevens et al. | 502/117 X |
| 5,066,741 | 11/1991 | Campbell, Jr. | 526/171 |
| 5,120,867 | 6/1992 | Welborn, Jr. | 556/12 |
| 5,132,380 | 7/1992 | Stevens et al. | 526/126 |
| 5,153,157 | 10/1992 | Hlatky et al. | 502/117 |
| 5,171,919 * | 12/1992 | Watanabe et al. | 526/943 |
| 5,198,401 * | 3/1993 | Turner et al. | 526/943 |
| 5,206,197 | 4/1993 | Campbell | 502/117 X |
| 5,227,440 | 7/1993 | Canich et al. | 526/129 |
| 5,240,894 * | 8/1993 | Burkhardt et al. | 526/160 |
| 5,241,025 | 8/1993 | Hlatky et al. | 526/129 |
| 5,314,973 | 5/1994 | Welborn, Jr. | 526/126 |
| 5,340,892 * | 8/1994 | Kuramoto | 526/160 |
| 5,420,217 * | 5/1995 | Canich | 526/161 |
| 5,441,920 | 8/1995 | Welborn, Jr. | 502/103 |
| 5,453,410 * | 9/1995 | Kolthammer et al. | 526/160 |
| 5,756,609 * | 5/1998 | Cohen | 502/132 |
| 5,817,590 * | 10/1998 | Hasegawa et al. | 502/121 |
| 6,017,842 * | 1/2000 | Rosen et al. | 502/132 |
| 6,191,240 * | 2/2001 | Galimberti | 502/132 |

FOREIGN PATENT DOCUMENTS

| | | |
|---|---|---|
| 2133181 * | 3/1995 | (CA) |
| 129368 | 12/1984 | (EP) |
| 277003 | 8/1988 | (EP) |
| 277004 | 8/1988 | (EP) |
| 416815 | 8/1990 | (EP) |
| 418044 | 3/1991 | (EP) |
| 420436 | 4/1991 | (EP) |
| 427696 | 5/1991 | (EP) |
| 427697 | 5/1991 | (EP) |
| 426637 | 8/1991 | (EP) |
| 426638 | 8/1991 | (EP) |
| WO 87/03887 | 7/1987 | (WO) |
| WO 91/04257 | 4/1991 | (WO) |
| WO 91/14713 | 10/1991 | (WO) |
| WO 92/00333 | 1/1992 | (WO) |
| WO 93/14132 | 7/1993 | (WO) |
| WO 95/12622 * | 5/1995 | (WO) |

OTHER PUBLICATIONS

M. Mason et al., J. Am. Chem. Soc., vol. 115, No. 12, pp. 4971–4984, 1993.*
L. Resconi et al., Macromolecules, vol. 23, No. 20, pp. 4489–4491, 1990.*
A. Barron, Organometallics, vol. 14, No. 7, pp. 3581–3583, 1995.*
N. Greenwood and A. Earnshaw, "Chemistry of the Elements", Pergamon Press, p. 289, 1984.*
Chemical & Engineering News, 63(5), pp. 21–23 (Feb. 4, 1985).
Shapiro et al., Organometallics, 1990, 9, 867–69 (Mar. 1990).
Okuda, Chem., Ber., 123, 1649–51, Aug. 1990.
R. Jordan, et al. JACS, 1986, 108, 7410–7411 (Nov. 12, 1986).
R. Jordan et al. JACS, 1986, 1718–1719 (Apr. 2, 1986).
A. Zambelli et al., Macromol; 1989, 22, 2186–2189 (May 1989).
Kirk–Othmer *Encyclopedia of Chemical Technology*, Third Edition, vol. 20, p. 655.

* cited by examiner

*Primary Examiner*—Mark L. Bell
*Assistant Examiner*—J. Pasterczyk
(74) *Attorney, Agent, or Firm*—William G. Muller; Charles E. Runyan

(57) ABSTRACT

A process for polymerizing olefins, diolefins, cyclic olefins or acetylenically unsaturated monomers, either alone or in combination with each other or with other polymerizable monomers with a catalyst system comprising a Group 4 transition metal cation having bonded thereto (1) a mono cyclopentadienyl ligand or polycyclic derivative thereof, (2) a Group 15 or 16 heteroatom ligand, said mono cyclopentadienyl ligand or polycyclic derivative and said heteroatom ligand being covalently bound and bridged, and (3) at least one other ligand; (b) a compatible non-coordinating anion; and a (c) a Group 13 element, hydrolyzable Lewis acid compound is disclosed.

18 Claims, No Drawings

CATALYST SYSTEM OF ENHANCED PRODUCTIVITY AND ITS USE IN POLYMERIZATION PROCESS

CROSS REFERENCE TO RELATED APPLICATIONS

This application is a divisional application of U.S. Ser. No. 07/957,305 filed Oct. 5, 1992, now abandoned, which in turn is a continuation-in-part of Ser. No. 07/542,236, filed Jun. 22, 1990, and a continuation-in-part of Ser. No. 07/496,378, filed Mar. 20, 1990, and issued as U.S. Pat. No. 5,153,157 on Oct. 6, 1992.

BACKGROUND OF THE INVENTION

1. Field of the Invention

This invention relates generally to the use of Group 13 element compounds to improve the productivity of ionic transition metal catalyst systems. More specifically the invention relates to the use of a Group 13 element organometallic compound as an additive to an ionic mono (cyclopentadienyl)/heteroatom transition metal olefin polymerization catalyst system. These catalyst systems have enhanced productivity over similar catalysts, in the absence of Group 13 compounds, for the polymerization of unsaturated monomer, e.g., olefinically unsaturated monomers such as ethylene, other ethylenically unsaturated olefins or olefinic species, diolefins, cyclic olefins, ethylenically unsaturated non-cyclic non-conjugated polyenes, cyclic non-conjugated polyenes, and acetylenically unsaturated monomers or combinations thereof, to form polymers such as polyolefins having narrow molecular weight distributions.

2. Background

Ziegler-Natta type catalysts for the polymerization of olefins are well known. The traditional Ziegler-Natta type systems comprise a metal halide activated to a catalyst species by reaction with a metal alkyl cocatalyst, particularly an aluminum alkyl cocatalyst. The activation of these traditional heterogeneous Ziegler-Natta catalysts generates a variety of different active sites. As a consequence of this non-uniformity of the active sites, the catalysts produce polymer products of broad molecular weight distribution (MWD). In many application, this broad MWD is undesirable. Furthermore, the polymer products exhibit relatively poor composition distribution (CD), comonomer incorporation and sequence distribution.

Also known are catalyst systems comprising a bis (cyclopentadienyl) ("Cp") transition metal and a compound cocatalyst. Such bis Cp transition metal compounds, in the presence of activators catalyze the polymerization of olefin monomers to polyolefins. Bis (Cp) transition metal compounds of the Group 4 metals, particularly of titanium and zirconium, have been used. When such transition metal components are cocatalyzed with an aluminum alkyl—the cocatalyst used with traditional Ziegler-Natta catalysts—the catalytic activity is generally to low for commercial applications.

From EP-A-129368 (Exxon) it is known that bis (Cp) transition metal components may be activated by alumoxanes. The bis(Cp) transition metal compound-alumoxane catalysts systems, whether homogeneous or supported, are versatile in that they may have a range of activities from low to high and may be used effectively to produce a variety of polymer products including, for example, low molecular weight copolymers high density linear polyethylene (HDPE), linear low density polyethylene (LLDPE), ethylene-propylene copolymer (EP), atactic polypropylene (a-PP), syndiotactic (s-PP) polypropylene and isotactic polypropylene (i-PP). The bis (Cp) transition metal compound-alumoxane catalyst systems also offer a significant advantage over the traditional Ziegler-Natta catalysts in that they are able to produce polymers with narrow MWD.

EP-A-0277003 (Exxon) and EP-A-0277004 (Exxon) teach a catalyst systems comprising a transition metal component and a non-coordinating anion. Such catalyst systems may be formed by activating the transition metal compound to a catalytic state by reaction with certain types of ionic exchange compositions.

U.S. Pat. No. 5055438 (Exxon), incorporated herein by reference, EP-A-420436 (Exxon), WO 91/04257 (Exxon) and EP-A-416815 (Dow) describe a further class of catalysts having a single cyclopentadienyl ring ligand and a heteroatom bonded to the metal atom, and their use in conjunction with alumoxanes. Similar catalyst systems are taught in U.S. Pat. No. 5,064,802 (Dow), incorporated herein by reference, EP-A-418044 (Dow) and WO 92/00333 (Exxon), but having a non-coordinating anion as activating cocatalyst. Here the catalyst system is prepared as a reaction product of a mono(cyclopentadienyl) heteroatom metal compound and an ionic activator compound. Such catalyst systems referred to as an "ionic mono (Cp)/heteroatom transition metal catalyst" or an "ionic mono(Cp) catalyst" permits the production of polyolefin products of narrow MWD at high rates of catalytic activity with good incorporation of comonomers and control of the chain end chemistry of the polymer products.

The active catalytic ion pair species of the ionic mono (Cp) catalyst may be irreversibly inactivated by Lewis base impurities contained in components of the polymerization medium such as the diluent or the monomer supply with which the ionic mono (Cp) catalyst is used. Despite the most elaborate control some, albeit minute, quantity of such Lewis base impurities will invariably be present in the polymerization medium, especially the commercial monomer supply. Therefore there is a need for an additive effective for use during polymerization to neutralize impurities contained in the polymerization medium without affecting the ability of these ionic mono (Cp) catalysts to produce polyolefin products.

SUMMARY OF THE INVENTION

This invention provides a catalyst system comprising an ionic mono (Cp) transition metal catalyst and an additive which neutralizes deactivators of the ionic catalyst active sites. More specifically, the invention provides a catalyst system comprising a mono(cyclopentadienyl)heteroatom Group 4 transition metal catalyst activated by an ion exchange reagent, and as a third or additive component, an organometallic compound preferably a Group 13 element organo compound. The presence of the specified additive neutralizes those impurities capable of deactivating the active catalytic sites of the ionic mono (Cp) catalyst, so providing a catalyst system which generally has greatly improved productivity without significantly affecting molecular weight or extent of comonomer incorporation.

The ionic mono (Cp) catalyst component of this invention comprises a complex having (i) a cationic portion derived from a Group 4 transition metal compound having a single delocalized substituted or substituted pi-bonded moiety bound in an $n^5$ bonding mode to the metal, and a heteroatom-containing moiety bonded to the metal through the heteroatom; and (ii) an anionic portion which is a non-coordinating compatible anion of a Bronsted acid salt. Such catalyst components are described in WO 92/00333. Thus the catalyst component may comprise derivatives of a Group 4 transition metal compound containing at least one ligand which will combine with an activator component or at least a portion thereof, such as a cation portion. The activator component of the catalyst, of which there may be more than one, is an ion-exchange compound comprising a cation which will irreversibly react with at least one ligand contained in said transition metal compound and an anion which is a single coordination complex comprising a plurality of lipophilic radicals or a plurality of boron atoms, covalently coordinated to and shielding a central formally charge-bearing metal or metalloid atom. The anion is bulky, labile and stable to any reaction involving the cation of the activator component. The charge-bearing metal or metalloid may be any metal or metalloid capable of forming a coordination complex which is not hydrolyzed by aqueous solutions. Upon combination of the mono (Cp) component and activator component, the cation of the activator component reacts with one of the ligands of the mono (Cp) component. That anion is compatible with, and noncoordinating toward, the metal cation formed from the mono (Cp) component. It is important that the anion of the activator compound be capable of stabilizing the transition metal cation complex without interfering with the ability of the transition metal cation or its decomposition product to function as a catalyst, and further that it be sufficiently labile to, permit displacement by an olefin, diolefin, acetylenically unsaturated monomer, or other polymerizable species, during polymerization. The selection of suitable mono (Cp) transition metal component(s)-activator pairs to produce ionic catalyst systems is dealt with in EP-A-0277003, EP-A-0277004 and WO 92/00333.

The additive component of the catalyst system is a Group 13 element compound such as a hydrolyzable Lewis acid which is able to neutralize impurities. These impurities include moisture or oxygen which reduce the activity of the ionic metallocene catalyst component.

DETAILED DESCRIPTION OF THE PREFERRED EMBODIMENTS

The polymerization process of this invention may be practiced with that class of ionic catalysts as described in EP-A-0277003, EP-A-0277004, PCT WO 92/00333 and U.S. Pat. No. 5,153,157. The ionic catalysts of the subject invention may be used in conjunction with a Group 13 organometallic additive to achieve enhanced productivity.

The ionic catalyst is prepared by combining two components. The first of these contains at least one cyclopentadienyl derivative of a Group 4 transition metal compound containing at least one ligand which will combine with the second component or at least a portion thereof such as a cation portion thereof. The second component is an ion-exchange compound comprising a cation which will irreversibly react with at least one ligand contained in said Group 4 transition metal compound and a noncoordinating anion which is bulky, labile, and stable. Upon combination of the first and second components, the cation of the second component reacts with one of the ligands of the first component, thereby generating an ion pair consisting of a transition metal cation and an anion; the cation is such that the metal center is in its highest formal oxidation stage ($d^0$) and a total formal charge of at least +1 on the transition metal center. For a Group 4 metal, it is desirable to have a formal coordination number of 3 and a valence of +4. The aforementioned anion is compatible with and non-coordinating towards the metal cation formed from the first component. The anion of the second compound must be capable of stabilizing the metal cation complex without interfering with the metal cation's or its composition product's ability to function as a catalyst and must be sufficiently labile to permit displacement by ethylene, other ethylenically unsaturated olefins or olefinic species, diolefins cyclic olefins, ethylenically unsaturated non-cyclic non-conjugated polyenes, cyclic non-conjugated polyenes, or an acetylenically unsaturated monomer during polymerization.

While comonomer insertion is high with these catalysts, it is remarkably easy, when they are employed to produce particularly ethylene-propylene copolymers, having greater weight average molecular weights at comparable or narrower molecular weight distributions than polyolefin products obtainable with a similar transition metal system which is activated by an aluminum trialkyl or alumoxane cocatalyst.

This invention provides for the use of certain Group 13 element compounds in catalyst systems comprising an ionic transition metal catalyst. Such a system may be employed, with appropriate selection of catalyst species and additive species, to yield an enhanced productivity, without significant adverse effects on the advantageous properties of the polymer product producible with such ionic catalyst. When employing the catalyst system as described a reduced concentration of ionic catalyst to produce polyolefins, may be needed as compared to use of a like catalyst without the additive. This appears to occur through a reduction of the neutralization of the active catalyst by adventitious impurities or alternatively expressed, though, the apparent "scavenging" activity of the Group 13 additive.

The catalyst system of the subject invention comprises:
(a) a reaction product of
 (i) at least one Group 4 transition metal compound and bonded to the metal atom:
  (1) a mono cyclopentadienyl ligand or polycyclic derivative thereof,
  (2) one Group 15 or 16 heteroatom ligand, and
  (3) at least one other ligand,
 (ii) an activator comprising
  (1) a cation which will irreversibly react with at least ligand of the metal compound, and
  (2) a labile, bulky, non-coordinating anion which is a single coordination complex having a plurality of lipophilic radicals covalently coordinated to, and shielding, a central charge-bearing metal or metalloid atom, or a plurality of boron atoms; and
(b) an organometallic additive compound.

The bulk of the anion is such that upon reaction of the cation with a ligand of the metal compound whereby a Group 4 transition metal cation is formed, the anion is sterically hindered from covalently coordinating to the transition metal cation by an unsaturated hydrocarbon having a Lewis base strength at least equal to ethylene. The activator component is a non-coordinating anion of a Bronsted acid salt. This invention also comprises a polymerization process using the catalyst system.

A. Metallocene Component of the Ionic Metallocene Catalyst

The Group 4 transition metal compounds, useful as the first component of the catalyst system employed in the process of this invention are mono(cyclopentadienyl) derivatives of titanium, zirconium or hafnium. In general, such useful titanium, zirconium and hafnium compounds may be represented by the following general formulae:

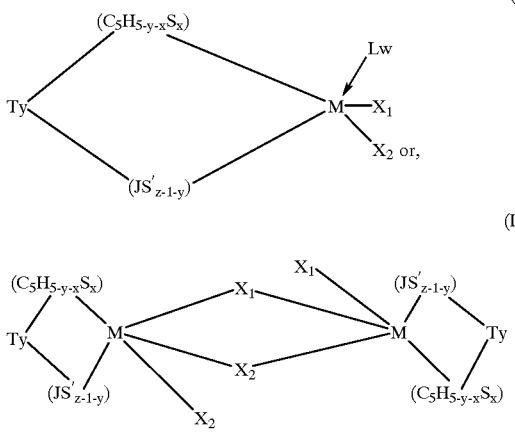

wherein:

M is a Group 4 metal;

$(C_5H_{5-y-x}S_x)$ is a cyclopentadienyl ring substituted with from zero to five R radicals;

x is from 1 to 5 denoting the degree of substitution;

each S substituent is, independently, a radical group which is a hydrocarbyl, substituted hydrocarbyl, halocarbyl, substituted halocarbyl, hydrocarbyl-substituted organometalloid, halocarbyl-substituted organometalloid radical, disubstituted boron, disubstituted pnictogen, substituted chalcogen, or halogen or any two adjacent S groups are joined forming a $C_4$ to $C_{20}$ ring to give a saturated or unsaturated polycyclic cyclopentadienyl ligand;

$(JS'_{z-1-y})$ is a heteroatom ligand in which J is an element from Group 15 of the Periodic Table of Elements (as described in *Chemical and Engineering News*, 63(5), 27, 1985) with a coordination number of 3 or an element from Group 16 with a coordination number of two; S' is a radical group which is a hydrocarbyl, substituted hydrocarbyl, halocarbyl, substituted halocarbyl, hydrocarbyl-substituted organometalloid, or halocarbyl-substituted organometalloid radical; and z is the coordination number of the element J;

$X_1$ and $X_2$ are, hydride radicals, hydrocarbyl radicals, substituted hydrocarbyl radicals, halocarbyl radicals, substituted halocarbyl radicals, and hydrocarbyl- and halocarbyl-substituted organometalloid radicals, or are joined and bound to the metal atom to form a metallacycle ring containing from about 3 to about 20 carbon atoms;

y is 0 or 1; when y is 1, T is a bridging group;

L is a neutral Lewis base;

w is a number from 0 to 3.

Illustrative, but non-limiting examples of X radicals include hydride, methyl, ethyl, phenyl, n-propyl, isopropyl, n-butyl, t-butyl, amyl, isoamyl, hexyl, cyclohexyl, heptyl, m-tolyl, p-tolyl, trifluoromethyl, tetramethylene and pentamethylene (both $X_1$ and $X_2$), trimethylsilyl, triphenylsilyl, and tris(trimethylsilyl)methyl.

Illustrative, but non-limiting examples of T include dimethylsilyl, diethylsilyl, di-n-propylsilyl, dicyclohexylsilyl, diphenylsilyl, methylphenylsilyl, di(p-tolyl)silyl, cyclotetraamethylenesilyl, cyclopentamethylenesilyl, dimethylgermyl, diphenylgermyl, phenylamido, t-butylamido, methylphosphido, phenylphosphido, methylene, dimethylmethylene, diphenylmethylene, ethylene, 1,2-dimethylethylene, 1,1,2,2-tetramethylethylene, propylene, and tetramethyl-disiloxane.

Illustrative but non-limiting examples of cyclopentadienyl and substituted cyclopentadienyl ligands include cyclopentadienyl, methylcyclopentadienyl pentadienyl 1,2-dimethylcyclopentadienyl, 1,3-dimethylcyclopentadienyl, tetramethylcyclopentadienyl, pentamethylcyclopentadienyl (when y=0) n-butylcyclopentadienyl, t-butylcyclopentadienyl, cyclohexylmethylcyclopentadienyl, phenylcyclopentadienyl, trifluoromethylcyclopentadienyl, indenyl, tetrahydroindenyl, fluorenyl, methylfluorenyl, octahydrofluorenyl, tri-methylsiylcyclopentadienyl, trimethylgermylcyclopentadienyl, dimethylaminocyclopentadienyl, diphenylphosphinocyclopentadienyl, and iodocyclopentadienyl.

Illustrative but non-limiting examples of $(JS'_{x-1-y})$ groups include methylamido, ethylamido, n-butylamido, t-butylamido, phenylarmido, p-tolylamido, pentafluorophenylamido, cyclohexylamido, methylphosphido, cyclohexylphosphido, phenylphosphido, and, when y=0, oxo, sulfido, methoxy, phenoxy, phenylthio, and acetylacetonato (includes L with w=1).

B. Activator Compound of the Metallocene Catalyst

Compounds useful as an activator component in the preparation of the catalyst component of the catalyst system of this invention comprise a cation, which is preferably but not necessarily a Bronsted acid generally capable of donating a proton, and a compatible noncoordinating anion containing a single coordination complex comprising a charge-bearing metal or metalloid core, which anion is relatively large (bulky), capable of stabilizing the active catalyst species (the Group 4 transition metal cation) which is formed when the metallocene and activator compounds are combined and said anion is sufficiently labile to be displaced by olefinic, diolefinic, ethylenically and acetylenically unsaturated substrates or other neutral Lewis bases such as ethers, nitriles and the like. Two classes of compatible non-coordinating anions have been disclosed in U.S. Pat. No. 5,153,157, incorporated by reference in its entirety: 1) anionic coordination complexes comprising a plurality of radicals covalently coordinated to and shielding a central charge-bearing metal or metalloid core, and, 2) anions comprising a plurality of boron atoms such as polyhedral boranes, carboranes, and metallacarboranes.

In one embodiment, the activator compounds useful in the preparation of the catalysts may be represented by the following general formula:

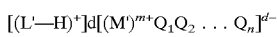

wherein:

H is a hydrogen atom;

[L'—H] is a Bronsted acid;

M' is a metal or metalloid;

each Q is, independently, a hydride radical, hydrocarbyl radical, substituted-hydrocarbyl radical, halocarbyl radical, substituted-halocarbyl radical, hydrocarbyl-substituted organometalloid radical, halocarbyl-substituted organometalloid radical, disubstituted pnictogen radical, substituted chalcogen radical, and any one, but not more than one of $Q_1$ to $Q_n$ a halogen radical;

m is an integer representing the formal valence charge of M'; and n is the total number of ligands Q.

As indicated above, any metal or metalloid capable of forming an anionic complex which is stable in water may be used or contained in the anion of the second compound. Suitable metals include, but are not limited to, aluminum, gold, platinum and the like. Suitable metalloids include, but are not limited to, boron, phosphorus, silicon and the like. Compounds containing anions which comprise coordination complexes containing a single metal or metalloid atom are, of course, well known and many, particularly such compounds containing a single boron atom in the anion portion, are available commercially. In light of this, salts containing anions comprising a coordination complex containing a single boron atom are preferred.

The preferred activator compounds comprising boron may be represented by the following general formula:

$$[L'-H]^+[BAr_1Ar_2X_3X_4]^-$$

wherein:

[L'—H] is as defined previously;

B is boron in a valence state of 3;

$Ar_1$ and $Ar_2$ are the same or different unsubstituted or substituted-aromatic hydrocarbon radicals containing from about 6 to about 20 carbon atoms and may be linked to each other through a stable bridging group; and $X_3$ and $X_4$ are, independently, hydride radicals, hydrocarbyl and substituted-hydrocarbyl radicals, halocarbyl and substituted-halocarbyl radicals, hydrocarbyl- and halocarbyl-substituted organometalloid radicals, disubstituted pnictogen radicals, substituted chalcogen radicals and halide radicals, with the proviso that $X_3$ and $X_4$ will not be halide at the same time.

In general, $Ar_1$ and $Ar_2$ may be, independently, any unsubstituted or substituted-aromatic hydrocarbon radical. Suitable aromatic radicals include, but are not limited to, naphthyl and anthracenyl radicals. Suitable substituents on the substituted-aromatic hydrocarbon radicals, include, but are not necessarily limited to, hydrocarbyl radicals, organometalloid radicals, alkoxy and aryloxy radicals, alkylamido radicals, fluorocarbyl and fluorohydrocarbyl radicals and the like such as those useful as $X_3$ and $X_4$. The substituent may be ortho, meta or para, relative to the carbon atoms bonded to the boron atom. When either or both $X_3$ and $X_4$ are a hydrocarbyl radical, each may be the same or a different aromatic or substituted-aromatic radical as are $Ar_1$ and $Ar_2$, or the same may be a straight or branched alkyl, alkenyl or alkynyl radical, a cyclic hydrocarbon radical or an alkyl-substituted cyclic hydrocarbon radical. $X_3$ and $X_4$ may also, independently be alkoxy or dialkylamido radicals wherein the alkyl portion of said alkoxy and dialkylamido radicals, hydrocarbyl radicals and organometalloid radicals and the like. As indicated above, $Ar_1$ and $Ar_2$ could be linked to either $X_3$ or $X_4$. Finally, $X_3$ and $X_4$ may also be linked to each other through a suitable bridging group.

Illustrative, but non-limiting, examples of boron compounds which may be used as an activator component in the preparation of the improved catalysts of this invention are trialkyl-substituted ammonium salts such as triethylammonium tetra(phenyl)boron, tripropyl-ammonium tetra(phenyl) boron, tri(n-butyl)ammonium tetra(phenyl)boron, trimethylammonium tetra(p-tolyl)boron, trimethylammonium tetra (o-tolyl)boron, tributylammonium tetra(pentafluorophenyl) boron, tripropylammonium tetra(o,p-dimethylphenyl)boron, tributylammonium tetra(m,m-dimethylphenyl)boron, tributylammoniumtetra(p-trifluoromethylphenyl)boron, tri (n-butyl)ammonium tetra(o-tolyl)boron and the like; N,N-dialkyl anilinium salts such as N,N-dimethyl-anilinium tetra (pentafluorophenyl)boron, N,N-diethylanilinium tetra (phenyl)boron, N,N-2,4,5-pentamethylanilinium tetra (phenyl)boron and the like; dialkyl ammonium salts such as di(i-propyl)ammonium tetra(pentafluorophenyl)boron, dicyclohexylammonium tetra(phenyl)boron and the like; and triaryl phosphonium salts such as triphenylphosphonium tetra(phenyl)boron, tri(methylphenyl)phosphonium tetra (phenyl)boron, tri(dimethylphenyl)phosphonium tetra (phenyl)boron and the like.

Similar lists of suitable compounds containing other metals and metalloids which are useful as activator components may be made, but such lists are not deemed necessary for complete disclosure. In this regard, it should be noted that the foregoing list is not intended to be exhaustive. Other useful boron compounds as well as useful compounds containing other metals or metalloids would be readily apparent to those skilled in the art from the foregoing general formulae.

C. Group 13 Element Compound

Group 13 additive compounds suitable for use in catalyst systems of the invention are represented by the following general formula:

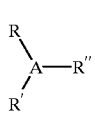

(III)

wherein;

A is a Group 13 element;

each R, R' and R" is a straight or branched $C_{1-20}$ chain hydrocarbyl radical which may include alkyl radicals, a $C_{4-20}$ cyclic hydrocarbyl radical, an $C_{3-20}$ alkyl-substituted cyclohydrocarbyl radical, a substituted or unsubstituted $C_{2-20}$ aromatic radical or an alkyl-substituted radical. R" may also be an $C_{1-20}$ alkoxide radical.

Illustrative, but non-limiting, examples of Group 13 element compounds which are suitable are: when A is aluminum (Al) the trialkyl or trihydrocarbyl aluminums such as trimethyl aluminum, triethyl aluminum, tri-n-propyl aluminum, tri-isopropyl aluminum, tri-n-butyl aluminum, tri-sec-butyl aluminum, tri-t-butyl aluminum, tri-isobutyl aluminum, tri-n-pentyl aluminum, tri-isopentyl aluminum, tri-neopentyl aluminum, tricyclopentyl aluminum, tri-n-hexyl aluminum, tri-n-octyl aluminum, tri-(4-methylpentyl) aluminum, tri(isoprenyl)aluminum, tri-(3-methylpentyl) aluminum, tricyclohexyl aluminum, and the like; alkyl aluminums such as dimethylethyl aluminum, methyldiethyl aluminum, ethyldimethyl aluminum, dimethyl-n-propyl aluminum, methyldi-n-propyl aluminum, dimethylisopropyl aluminum, dimethylcyclohexyl aluminum, methylethylpropyl aluminum, and the like; aryl and alkyl-substituted aluminums, such as triphenyl aluminum, tri-p-tolyl aluminum, tri-m-tolyl aluminum, tri-p-ethyl aluminum, and the like. Also suitable are aluminum alkoxides and aryloxides such as dimethyl aluminum methoxide, dimethyl aluminum ethoxide, diethyl aluminum ethoxide, diethyl aluminum isopropoxide, methyl ethyl aluminum methoxide, dimethyl aluminum 4-methylphenoxide, dimethyl aluminum 3-methylphenoxide, dimethyl aluminum 2,6-diisopropylphenoxide, dimethyl aluminum 2,6-di-t-butyl-4-methylphenoxide, and the like.

A similar list of illustrative Group 13 element compounds when A is boron could be made for the trialky boranes, alkyl boranes, and alkyl borane alkoxides. Also a similar list could be given for the analogous compounds of gallium and indium, although the gallium and indium analogues are less preferred. Such list would be nearly identical to that already presented with respect to the aluminum species of Group 13 element compounds and therefore such listing of the borane analogues and other Group 13 elements are not deemed necessary to a complete disclosure.

Choice of Mono (Cp) Transition Metal-Activator Pairs

In general, and while most transition metals identified above may be combined with most activators identified above to produce an active olefin polymerization catalyst, it is important to continued polymerization operations that either a metal cation initially formed from the mono (Cp) transition metal or a decomposition product thereof be a relatively stable catalyst. It is also important that the anion of the activator be stable to hydrolysis when an ammonium salt is used. Further, it is important that the acidity of the activator is sufficient, relative to the transition metal to facilitate a reaction between a ligand of the metal (or first component) with the cation of the activator (or second component) species. Activator compounds containing aryl-ammonium salts such as N,N-dimethylanilinium are more acidic than trialkylammonium salts and therefore are more useful with a wider range of transition-metal compounds.

With respect to the combination of transition metals with activators to form the catalyst component of this invention, it should be noted that the two compounds combined for preparation of the active catalyst must be selected to avoid transfer of a fragment of the anion, particularly an aryl group, to the metal cation. Such a transfer could form a catalytically inactive species. This could be accomplished through steric hindrance, resulting from substitutions on the cyclopentadienyl carbon atoms as well as substitutions on the aromatic carbon atoms of the anion. It follows, then, that mono (Cp) transition metals comprising perhydrocarbyl-substituted cyclopentadienyl radicals could be effectively used with a broader range of activators than could components comprising unsubstituted cyclopentadienyl radicals. As the amount and size of the substitutions on the cyclopentadienyl radicals are reduced, however, more effective catalysts are obtained with activators containing anions which are more resistant to degradation, such as those with substituents on the ortho positions of the phenyl rings. Another means of rendering the anion more resistant to degradation is afforded by fluorine substitution, especially perfluoro substitution, in the anion. Fluoro-substituted stabilizing anions of the type $[B(C_6F_5)_4]^-$ or $[B(C_6F_5)_3Q]^-$, wherein Q is a monoanionic non-bridging hydride, hydrocarbyl, substituted-hydrocarbyl, halocarbyl, substituted-halocarbyl, hydrocarbyl- or halocarbyl-substituted organometalloid, substituted pnictogen or chalcogen, or halogen radical may, then, be used with a broader range of metallocenes.

The catalyst system of the present invention may be placed on a support in accordance with that described in copending application U.S. Ser. No. 459,921 and its continuation in part application Ser. Nos 926,006 filed Aug. 5, 1992 which describe the most preferred embodiments of the support procedure. U.S. patent application Ser. No. 459,921 and 926,006 are herein incorporated by reference in their entirety.

Polymerization Process

In an embodiment of the present invention, a Group 4 transition metal compound containing a substituted or unsubstituted mono(cyclopentadienyl) radical and a heteroatom radical made in accordance with WO 92/00333 one or two lower alkyl substituents and/or one or two hydride substituents will be combined with a trisubstituted ammonium salt of either a substituted or unsubstituted tetra (aromatic)boron. Each of the trisubstitutions in the ammonium cation will be the same or a different lower alkyl or aryl radical. Substituted anions are preferred as anions in the trisubstituted ammonium salts, particularly, pentafluorosubstituted anions. N,N-dimethylanilinium tetra(fluorophenyl) boron is particularly preferred.

Any solvent or diluent previously described as suitable for preparing the ionic mono (Cp) transition metal catalyst component is also suitable as a polymerization diluent for preparing catalyst systems of the invention. Techniques or conditions for polymerization of monomers with the present catalyst system include high pressure, liquid, solution, bulk phase, slurry, and gas phase polymerization procedures.

While the ionic mono (Cp) catalyst systems do not contain pyrophoric species, it is nevertheless preferred that the catalyst components be handled in an inert, moisture-free, oxygen-free environment such as argon, nitrogen, or helium because of the sensitivity of the catalyst components to moisture and oxygen. The Group 13 element compounds must also be handled in a similar manner.

A preferred process for polymerizing monomers comprises:

(a) contacting ethylene, other alpha-olefins, cyclic olefins, ethylenically unsaturated non-cyclic non-conjugated poly-enes, cyclic non-conjugated poly-enes, acetylenically unsaturated monomers, or mixtures thereof with the catalyst system as described herein;

(b) maintaining the contacting step of (a) for a sufficient time, and under conditions sufficient to polymerize monomers; and (c) recovering polymer product.

Alternatively, the transition metal and activator components are combined in a first step in an aromatic solvent to produce a solution of the ionic catalyst. This reaction may be carried out in the temperature range of about −100° C. to about 300° C., preferably about 0° C. to about 100° C. Holding times to allow for the completion of the reaction may range from about 10 seconds to about 60 minutes depending upon variables such as reaction temperature and choice of reactants.

Once the ionic catalyst component is formed, the order or method of addition of the Group 13 element compound to the polymerization diluent with ionic catalyst is not critical. The catalyst system may be formed by: 1) first adding the Group 13 element compound to the polymerization diluent followed by addition of the ionic catalyst; 2) direct addition of the Group 13 element compound to a solution of ionic catalyst after which the common solution is added to a polymerization diluent; or 3) a portion of the Group 13 element compound may be added to a liquid monomer and supplied to the polymerization diluent containing ionic catalyst as the liquid monomer is supplied to the diluent. When a liquid monomer is used in the polymerization process, it is preferred to add the Group 13 element compound to the liquid monomer. The additive may be added neat or as a solution in a suitable hydrocarbon solvent, preferably an aliphatic or aromatic solvent.

Compared to an ionic mono (Cp) catalyst in a polymerization diluent from which a Group 13 element compound is absent, the use of too great an amount of Group 13 element compound in forming a catalyst system of the invention will suppress the productivity of the ionic mono (Cp) catalyst component. On the other hand, the use of too small an amount of Group 13 element compound will not produce an enhancement in productivity of the ionic mono (Cp) catalyst system. The optimum amount of Group 13 element compound for use in producing catalyst systems of the invention is dependent, in part upon the amount of Lewis base impurities contained in the polymerization diluent and/or monomers used in polymerization. In a typical polymerization process, it is expected that the optimum amount of Group 13 element compound to be added to obtain a catalyst system of maximum productivity will amount to a mole ratio of Group 13 element compound to activator compound of from about 1:1 to about 200:1, preferably 15:1 to 150:1. The preferred ratio of activator to transition metal component is from about 1:1 to about 20:1.

For a given polymerization process, the optimum amount of Group 13 element compound to be added to a polymerization diluent in which an ionic mono (Cp) catalyst component is present for forming a catalyst system of enhanced activity may readily be determined by monitoring the level of monomer consumption while adding the Group 13 element compound to the polymerization diluent until an amount of Group 13 element compound has been added which maximizes the rate at which the monitored monomer is consumed by the polymerization reaction. Alternatively, a portion of the Group 13 element compound is first added to the polymerization diluent after which the ionic mono (Cp) catalyst is added and polymerization is initiated and the rate of monomer consumption is monitored. Then, while polymerization is ongoing, an additional quantity of the Group 13 element compound is added and the consumption is observed. It should, however, be borne in mind that the objective of adding the additive is to neutralize impurities such as water or oxygen so that the level of additive addition should also be proportioned to the level of impurities present. Thus, it may be advantageous to pretreat a monomer having a relatively high level of such impurities with the additive before the monomer is brought into contact with the catalyst system.

The value of the Group 13 additive compound is selected to suit the catalyst, to gain optimum effect. Thus if the catalyst is one where the heteroatom (J) group or the bridging (T) group does not carry bulky substituents, then it is preferred to employ as Group 13 additive compound (a) a boron compound (which in general is less acidic and hence less interactive with the transition metal than aluminum compounds); or an aluminum compound which carries at least one substituent which is bulky. The bulky substituents serve to prevent, sterically, the additive metal eg. aluminum, from interacting with, and hence deactivating, the transition metal catalyst site. Preferably the Group 13 additive compound contains at least one $C_4$–$C_{20}$ substituent, especially where the Group 13 element is aluminum and the catalyst transition metal is not "protected" by bulky substituents in the transition metal compound. Preferably, when the Group 13 compound contains a C4 substituents, it is branched.

In the case where the heteroatom group on the transition metal of the catalyst compound is substituted with a 30° carbon atom, the bulkiness of the Group 13 compound substituents becomes less important. However with 1° and 2° substituents, the nature of the additive substituent size takes a greater importance for overall performance of the catalyst system. With specific reference to catalyst of formula (I) or (II), and Group 13 compounds of formula (III), it is preferred, especially when A is aluminum, that one or more of R, R', and R" are $C_{4-20}$ groups, when S' contains a primary or secondary carbon atom bonded directly to J. Most preferably, in the case of one or more of R, R' and R" being a $C_4$ radical, said radical is branched. More expressly, mono Cp heteroatom containing transition metal compounds which compare the catalyst component of the inventive catalyst system and which have bulky substituents on the hetero eg. amido groups, such as t-butyl, will polymerize monomers with enhanced productivity when employing any trialkyl aluminum or boron additive. However, mono Cp components with less bulky substituents are more effective with additives such as tri-isobutylaluminum (TiBAL), tri-n-octylaluminum (TNOA), tri-n-hexylaluminum (TNHA) than any with less bulky additives such as trimethylaluminum (TMA).

In general, the catalyst systems of this invention will polymerize olefins, diolefins and/or ethylenically or acetylenically unsaturated monomers either alone or in combination with other olefins and/or other unsaturated monomers at conditions well known in the prior art for conventional Ziegler-Natta catalysts.

Monomers which may be utilized in practice of the process include ethylene, other alpha-olefins, diolefins, cyclic olefins, ethylenically unsaturated non-cyclic non-conjugated polyenes, cyclic non-conjugated polymers, acetylenically unsaturated monomers, or combinations thereof, unsaturated hydrocarbons containing from about 2 to about 18 carbon atoms. Such monomers include cyclic and acyclic hydrocarbons, and straight or branched chain hydrocarbons. Illustrative, but non-limiting, of suitable monomers are: ethylene, propylene, butene-1, pentene-1, hexene-1, octene-1, decene-1, 2-methyl-propene-1, 3-methylbutene-1, 2-methylbutene-1, 3-methylpentene-1, 4-methylpentene-1, 1,3-butadiene, 1,4-pentadiene, 1,5-hexadiene, 1,4-hexadiene, cyclopentene, cyclohexene, cycloheptene, propyne, butadyne, styrene, and 1,4-dihexyne.

In a most preferred embodiment of the present invention, a dimethyl Group 4 transition metal compound—containing one tetramethylcyclopentadienyl radical and an alkyl amido radical, the two radicals covalently bonded and bridged through a silylalkylene group—is reacted with N,N-dimethylanilinium tetra(pentafluorophenyl)boron to produce the most preferred ionic catalyst. The transition metal and activator components are combined at a temperature within the range from about 0° C. to about 300° C., more preferably at from about 25° to 100° C., and at a pressure within the range from about 15 to about 500 psig. In a most preferred embodiment of the present invention, the most preferred catalyst system is used either to homopolymerize ethylene or to copolymerize ethylene with a lower alpha-olefin having from 3 to 6 carbon atoms, thereby yielding a plastic or an elastomeric copolymer. In both preferred process embodiments, the monomers are maintained at polymerization conditions for a nominal holding time within the range from about 1 to about 60 minutes and the system is within the range from about $10^{-6}$ to about $10^{-5}$ moles of transition metal per liter of polymerization diluent, while a mole ratio of the Group 13 element compound to activator compound employed is maintained at from about 15:1 to about 150:1.

The use of the invention catalyst system which includes an appropriately selected additive for neutralizing impurities may result in an improvement of from 20 to 400% or more in ionic metallocene catalyst productivity over the ionic catalyst without the additive.

In general, catalyst systems can be tailored so as to produce polymer products which will be substantially free of certain trace metals generally found in polymers produced with Ziegler-Natta type catalysts such as aluminum, magnesium, chloride and the like. Thus, for instance, the level of impurities may be monitored continuously and the rate of additive injection may be is controlled to provide only that quantity of additive necessary to protect the catalyst sites from deactivation and not such an excess of additive so as to impair product quality or necessitate further processing to purify the polymer product. The polymer products produced with the catalyst system of the present invention or those as described in U.S. Pat. No. 5,153,157 have a broader range of applications than polymers produced with either the more conventional Ziegler-Natta type catalysts comprising a metal alkyl, such as an aluminum alkyl, or the metallocene-alumoxane catalysts which typically require an excess of the alumoxane catalyst.

The following examples serve to illustrate the invention and some of its advantages and are not intended to limit the scope of the invention as disclosed above or claimed hereafter.

EXAMPLES

Example 1

Ethylene was polymerized in a hexane diluent by adding dry, oxygen-free hexane (400 ml) to a 1-liter stainless steel autoclave which had been previously flushed with nitrogen. Under nitrogen, a hexane solution (20 ml) containing 0.2 mmoles of triethylaluminum was transferred into the autoclave by means of a double-ended needle followed by a solution of methylphenylsilyl (t-butylamido) tetramethylcyclopentadienylhafnium dimethyl (20 mg) and N,N-dimethylanilinium tetrakis (pentafluorophenyl)boron (5 mg) in toluene (10 ml). The solution in the autoclave was heated to 40 C. and stirred under 90 psi of ethylene. After two hours, the autoclave was vented and opened. The yield of polyethylene was 63.3 g.

Example 2 (Comparative)

Ethylene was polymerized using the same catalyst components, solvents and equipment, and substantially the same concentrations, temperatures, and pressures as in Example 1 with the exception that no triethylaluminum was used. Polymerization was discontinued after 35 minutes, when it was apparent that substantially no polymerization reaction was taking place. This was in contrast to Example 1 wherein polymerization commenced almost at once. The yield of polyethylene was 0.7 g.

Example 3

An ionic catalyst was prepared by dissolving 50 ml of dimethylsilyl (cyclododecylamido) tetramethylcyclopentadienyltitanium dimethyl and 25 mg N,N-dimethylanilinium tetrakis(pentafluorophenyl)boron in 10 ml toluene. Dry, oxygen-free hexane (400 ml) was added to a 1 liter stainless steel autoclave which had been previously flushed with nitrogen. Under nitrogen, a hexane solution (2 ml) containing 0.25% triisoprenylaluminum was transferred into the autoclave by means of a double-ended needle, followed by 4 ml of the catalyst solution. The ratio of titanium containing catalyst to boron containing activator was 3.7. The solution in the autoclave was heated to 80° C. and 4.42 atmospheres of ethylene (.228 moles) were introduced. Polymerization was carried out for 0.1 hours, after which time the autoclave was vented and opened. The yield of polyethylene was 2.1 grams. This corresponds to productivity of 61 kg polymer/mole activator atmosphere hour, or 269 kg polymer/mole activator hour.

Example 4

Example 3 was repeated, except that 23 ml of activator were used (thus catalyst: activator mole ratio is 4.0), and the polymerization was carried out for 0.12 hours. The yield of polyethylene was 2.5 grams, which corresponds to 67 kg polymer/mole activator atmosphere hours, or 298 kg polymer/mole activator hour.

Example 5

Example 4 was repeated, except that no scavenging additive (triisoprenylaluminum) was introduced into the reactor, and the polymerization reaction was carried out for 0.4 hours. The yield of polyethylene was 7.2 grams, corresponding to 57 kg polymer/mole activator atmosphere hours or 251 kg polymer/mole activator hours.

Examples 1 and 2 demonstrate the major effect that addition of a scavenging additive in a catalyst system according to the invention has, on the productivity of the catalyst system. Similarly, examples 3–5 demonstrate that the use of the scavenging additive leads to an improvement in productivity of the catalyst system. Selection of the scavenging additive in association with the nature of the catalyst and the activator, will enable productivities to be adjusted, depending on the amounts of impurities which are otherwise in the system.

The invention has been described with reference to its preferred embodiments. Those of skill in the art may appreciate from the description changes and modification which may be made which do not depart from the scope and spirit of the invention as described above and claimed hereafter.

What is claimed is:

1. A process of polymer monomers, comprising
   (a) contacting one or more members of the group consisting of olefins, cyclic olefins, and acetylenically unsaturated monomers with a combination comprising:
      (i) a Group 4 transition metal cation hating bonded thereto
         (1) a single cyclopentadienyl moiety or polycyclic derivative thereof,
         (2) a N, O, S or P heteroatom moiety, said cyclopentadienyl moiety or polycyclic derivative thereof and said heteroatom moiety being both bonded to the Group 4 transition metal atom and either bonded directly to each other or bonded to each other via a bridging group, and
         (3) at least one ligand selected from the group consisting of hydride, hydrocarbyl, substituted hydrocarbyl, and hydrocarbyl substituted organometalloid radicals;
      (ii) a compatible non-coordinating anion; and
      (iii) a hydrolyzable Lewis acid compound containing a Group 13 atom; and
   (b) maintaining contacting step (a) for a sufficient time, and under conditions sufficient to polymerize said members;
   provided that if said Group 13 atom is aluminum and there is no tertiary carbon substituent on at least one of said heteroatom moiety, said Group 4 transition metal cation and said bridging group, said hydrolyzable Lewis acid compound is a compound of the general formula AlRR'R" wherein each R, R' and R" is a straight or branched $C_1$–$C_{20}$ chain hydrocarbyl radical selected from the group consisting of alkyl radicals, $C_4$–$C_{20}$ cyclic hydrocarbyl radicals, $C_3$–$C_{20}$ alkyl-substituted cyclohydrocarbyl radicals, substituted or unsubstituted $C_6-C_{20}$ aromatic radicals and alkyl-substituted aromatic radicals, further wherein one of R, R' and R" may additionally be a $C_1-C_{20}$ alkoxy radical and wherein at least one of R, R' and R" is a $C_4-C_{20}$ substituent.

2. The process of claim 1 wherein said members comprise, ethylene, propylene, 1-butene, 4-methyl-1-pentene, 1-hexene, 1-octene, styrene, norbornene, or combinations thereof.

3. The process of claim 1, wherein the hydrolyzable Lewis acid comprises a trihydrocarbylaluminum, trialkylaluminum, trihydrocarbylborane, triallkylborane or mixtures thereof.

4. The process of claim 1 wherein the contacting step (a) is conducted under conditions of high pressure, solution phase, liquid phase, bulk phase, slurry phase, or gas phase polymerization conditions.

5. The process of claim 1 wherein said hydrolyzable Lewis acid compound is an aluminum or boron compound.

6. The process of claim 5 wherein said Group 4 transition metal is titanium.

7. The process of claim 5 wherein said Group 4 transition metal is hafnium or zirconium.

8. The process of claim 5 wherein said hydrolyzable Lewis acid compound is represented by the formula

wherein:

A is aluminum or boron;

each R, R' and R" is a hydrocarbyl radical selected from the group consisting of an $C_1-C_{20}$ alkyl radical, a $C_4-C_{20}$ cyclic hydrocarbyl radical, a $C_3-C_{20}$ alkyl-substituted cyclohydrocarbyl radical, a substituted or unsubstituted $C_6-C_{20}$ aromatic radical and, an alkyl-substituted aromatic radical, and wherein R" may additionally be a $C_1-C_{20}$ alkoxy radical.

9. The process of claim 8 wherein said Group 4 transition metal has as a heteroatom moiety bonded thereto a nitrogen atom having bound thereto a primary or secondary carbon atom.

10. The process of claim 8 wherein said Group 4 transition metal is hafnium or zirconium.

11. The process of claim 9 wherein said hydrolyzable Lewis acid compound is triisobutyl aluminum, triisoprenyl aluminum, tri-n-octyl aluminum or tri-n-hexyl aluminum.

12. The process of claim 9 wherein at least one of said R, R', and R" is a branched $C_4$ group.

13. The process of claim 5 wherein said Group 4 transition metal is titanium and the process is one of high pressure, gas phase or solution phase.

14. The process of claim 13 wherein said members comprise ethylene and propylene.

15. The process of claim 13 wherein said members comprise ethylene and norbornene.

16. The process of claim 13 wherein said members comprise ethylene and one or more of, 1-hexene and 1-octene.

17. A process of polymerizing monomers, comprising
(a) contacting one or more members of the group consisting of olefins, cyclic olefins, and acetylenically unsaturated monomers with a combination comprising:
(i) a Group 4 transition metal cation having bonded thereto
(1) a single cyclopentadienyl moiety or polycyclic derivative thereof,
(2) a N, O, S or P heteroatom moiety, said cyclopentadienyl moiety or polycyclic derivative thereof and said heteroatom moiety being both bonded to the Group 4 transition metal atom and either bonded directly to each other or bonded to each other via a bridging group, and
(3) at least one ligand selected from the group consisting of hydride, hydrocarbyl, substituted hydrocarbyl, and hydrocarbyl substituted organo-metalloid radicals;
(ii) a compatible non-coordinating anion; and
(iii) a hydrolyzable Lewis acid compound containing a Group 13 atom, wherein said Group 13 atom is present in a molar ratio to said (ii) anion of 1:1 to 200:1; and
(b) maintaining contacting step (a) for a sufficient time, and under conditions sufficient to polymerize said members;

provided that if said Group 13 atom is aluminum and there is no tertiary carbon substituent on at least one of said heteroatom moiety, said Group 4 transition metal cation and said bridging group, said hydrolyzable Lewis acid compound is a compound of the general formula AlRR'R" wherein each R, R' and R" is a straight or branched $C_1-C_{20}$ chain hydrocarbyl radical selected from the group consisting of all radicals, $C_4-C_{20}$ cyclic hydrocarbyl radicals, $C_3-C_{20}$ alkyl-substituted cyclohydrocarbyl radicals substituted or unsubstituted $C_6-C_{20}$ aromatic radicals and alkyl-substituted aromatic radicals, further wherein one of R, R' and R" may additionally be a $C_1-C_{20}$ alkoxy radical and wherein at least one of R, R' and R" is a $C_4-C_{20}$ substituent.

18. The process of claim 17 wherein said hydrolyzable Lewis acid compound containing a Group 13 atom is present in a molar ratio to said (a) (ii) anion of 15:1 to 150:1.

* * * * *